(12) United States Patent
Renault (10) Patent No.: US 11,505,063 B2
(45) Date of Patent: Nov. 22, 2022

(54) ENERGY MANAGEMENT SYSTEMS (EMS) FOR TRANSPORTATION REFRIGERATION UNITS (TRU)

(71) Applicants: Carrier Corporation, Palm Beach Gardens, FL (US); Loïc Renault, Franqueville St Pierre (FR)

(72) Inventor: Loïc Renault, Franqueville St Pierre (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 243 days.

(21) Appl. No.: 17/056,624

(22) PCT Filed: May 30, 2018

(86) PCT No.: PCT/IB2018/000756
§ 371 (c)(1),
(2) Date: Nov. 18, 2020

(87) PCT Pub. No.: WO2019/229490
PCT Pub. Date: Dec. 5, 2019

(65) Prior Publication Data
US 2021/0206261 A1    Jul. 8, 2021

(51) Int. Cl.
*B60K 25/08* (2006.01)
*B60H 1/00* (2006.01)
(Continued)

(52) U.S. Cl.
CPC ......... *B60K 25/08* (2013.01); *B60H 1/00428* (2013.01); *F16H 37/02* (2013.01);
(Continued)

(58) Field of Classification Search
CPC ........ F16H 37/02; F16H 37/065; F16H 37/40; F16H 37/42; F16H 37/44; F16H 61/662;
(Continued)

(56) References Cited

U.S. PATENT DOCUMENTS 750,499 A    1/1904 Sperry
1,428,693 A    9/1922 Egbert
(Continued)

FOREIGN PATENT DOCUMENTS

CA    2726205 A1 *  6/2011  ............... B60K 1/02
CN    2044647 U    9/1989
(Continued)

OTHER PUBLICATIONS

Chinese Office Action Issued in Chinese Application No. 201880093964.1 dated Jul. 7, 2021; 5 Pages.
(Continued)

*Primary Examiner* — Tinh Dang
(74) *Attorney, Agent, or Firm* — Cantor Colburn LLP (57) ABSTRACT

Disclosed is a transportation unit comprising: a plurality of roadway wheels including wheel, a plurality of continuously variable transmissions (CVTs) including a first CVT and a second CVT, the plurality of CVTs receiving rotational input from the wheel, and a generator that is rotationally driven by rotational output from the plurality of CVTs, and wherein each of the plurality of CVTs is engaged over one of a corresponding plurality of discrete wheel rotational speeds.

20 Claims, 4 Drawing Sheets

(51) Int. Cl.
  *F16H 37/02* (2006.01)
  *F16H 37/06* (2006.01)
  *F16H 59/40* (2006.01)
  *F16H 59/44* (2006.01)
  *F16H 59/42* (2006.01)
  *F16H 61/662* (2006.01)
  *B60P 3/20* (2006.01)

(52) U.S. Cl.
  CPC .......... *F16H 37/065* (2013.01); *F16H 59/40* (2013.01); *F16H 59/42* (2013.01); *F16H 59/44* (2013.01); *F16H 61/66231* (2013.01); *B60P 3/20* (2013.01)

(58) Field of Classification Search
  CPC ....... F16H 9/12; B60K 25/08; B60H 1/00428; B60H 1/3226; B60H 1/00364; B60P 3/20; Y02T 10/88
  See application file for complete search history.

(56) References Cited

U.S. PATENT DOCUMENTS

| | | | |
|---|---|---|---|
| 1,537,871 | A | 5/1925 | Newman |
| 1,609,138 | A | 11/1926 | Sunderland |
| 1,775,754 | A | 9/1930 | Fageol |
| 2,104,381 | A | 1/1938 | Alexander et al. |
| 2,528,475 | A | 10/1950 | Parry |
| 4,056,987 | A * | 11/1977 | Hoffmann ................ F16H 9/12 475/210 |
| 4,496,016 | A | 1/1985 | Unsworth et al. |
| 4,736,642 | A | 4/1988 | Lampert |
| 5,514,053 | A | 5/1996 | Hawkins et al. |
| 6,184,603 | B1 | 2/2001 | Hamai et al. |
| 7,946,113 | B1 | 5/2011 | Bishop |
| 8,261,883 | B2 | 9/2012 | Ariga et al. |
| 8,328,668 | B2 | 12/2012 | Ariga et al. |
| 8,366,575 | B2 | 2/2013 | Ariga et al. |
| 8,393,989 | B2 | 3/2013 | Pohl |
| 8,512,189 | B2 | 8/2013 | Holmes et al. |
| 9,389,007 | B1 | 7/2016 | McKay |
| 9,527,375 | B2 | 12/2016 | Clark et al. |
| 9,748,886 | B1 | 8/2017 | McDonald et al. |
| 9,956,850 | B2 * | 5/2018 | Casasanta ............ B60H 1/0045 |
| 2010/0154449 | A1 | 6/2010 | Stover, Jr. et al. |
| 2016/0272048 | A1 * | 9/2016 | Casasanta ............ H02K 7/025 |
| 2017/0361842 | A1 | 12/2017 | Livshiz et al. |

FOREIGN PATENT DOCUMENTS

| | | |
|---|---|---|
| CN | 1046791 A | 11/1990 |
| CN | 1173597 A | 2/1998 |
| CN | 1266959 A | 9/2000 |
| CN | 2516729 Y | 10/2002 |
| CN | 1168896 C | 9/2004 |
| CN | 201293712 Y | 8/2009 |
| CN | 101578211 A | 11/2009 |
| CN | 101583528 B | 11/2009 |
| CN | 102356718 A | 2/2012 |
| CN | 102405714 A | 4/2012 |
| CN | 102431624 A | 5/2012 |
| CN | 101482162 B | 4/2013 |
| CN | 103223849 B | 8/2015 |
| CN | 105150865 A | 12/2015 |
| CN | 105518349 A | 4/2016 |
| CN | 105673834 A | 6/2016 |
| CN | 105782384 A | 7/2016 |
| CN | 105917147 A | 8/2016 |
| CN | 205423797 U | 8/2016 |
| CN | 106949207 A | 7/2017 |
| CN | 107745632 A | 3/2018 |
| CN | 101178019 A | 5/2018 |
| DE | 3935304 A1 | 4/1991 |
| EP | 1544019 A1 | 6/2005 |
| EP | 3040305 B1 | 12/2017 |
| GB | 2531335 A | 4/2016 |
| JP | 11078619 A | 3/1999 |
| JP | 11078621 A | 3/1999 |
| JP | 11082084 A | 3/1999 |
| JP | 2004222462 A | 8/2004 |
| JP | 03624668 B2 | 3/2005 |
| JP | 3624668 B2 | 3/2005 |
| JP | 3754188 B2 | 3/2006 |
| JP | 2006194263 A | 7/2006 |
| JP | 1144586 B2 | 9/2008 |
| JP | 2009208723 A | 9/2009 |
| JP | 1590773 B2 | 12/2010 |
| JP | 5169585 B2 | 3/2013 |
| KR | 584785 B1 | 5/2006 |
| KR | 2008017889 A | 2/2008 |
| KR | 2010002788 A | 1/2010 |
| KR | 2015133026 A | 11/2015 |
| KR | 1718147 B1 | 3/2017 |
| KR | 1807435 B1 | 12/2017 |
| WO | 2006110856 A2 | 10/2006 |
| WO | 2010074938 A1 | 7/2010 |
| WO | 2012068265 A1 | 5/2012 |

OTHER PUBLICATIONS

Notification of Transmittal of the International Search Report and the Written Opinion of the International Searching Authority, or the Declaration; PCT/IB2018/000756; dated Feb. 1, 2019; 15 pages.

* cited by examiner

ENERGY MANAGEMENT SYSTEMS (EMS) FOR TRANSPORTATION REFRIGERATION UNITS (TRU)

CROSS REFERENCE TO RELATED APPLICATIONS

This is a US National Stage of Application No. PCT/IB2018/000756, filed on May 30, 2018, the disclosure of which is incorporated herein by reference.

BACKGROUND

Exemplary embodiments pertain to the art of energy management systems (EMS) for transportation refrigeration units (TRU) and more specifically to an EMS having a plurality of continuously variable transmissions (CVTs) to run a TRU generator so as to charge one or more TRU batteries.

In some known energy management systems (EMS), electric generators for a transportation refrigeration unit (TRU) may be driven by axle shaft energy. When a trailer speed is over 30 km/h the generator may be driven to charge TRU electric batteries. When the trailer speed is below 30 km per hour, the shaft power necessary to drive the generator may be insufficient. This may be due to a 1:10 fix gear box ratio between the trailer axle and the generator. Thus below 30 km/h, the generator is not able to run and axle shaft energy may be lost.

Mechanical energy from axles in a transport refrigeration unit (TRU) may drive a generator with a fixed ratio. This fixed ratio may result in lost energy as the generator may be unable to generate energy when trailer speeds are below 30 km/h. Battery sizes and inverters are selected and designed to support TRU refrigeration (reefer) unit operations when a generator is outside of designed operational conditions.

BRIEF DESCRIPTION

Disclosed is a transportation unit comprising: a plurality of roadway wheels including wheel, a plurality of continuously variable transmissions (CVTs) including a first CVT and a second CVT, the plurality of CVTs receiving rotational input from the wheel, and a generator that is rotationally driven by rotational output from the plurality of CVTs, and wherein each of the plurality of CVTs is engaged over one of a corresponding plurality of discrete wheel rotational speeds.

In addition to one or more of the above disclosed features or as an alternate the transportation unit comprises a plurality of axles including a first axle and a second axle, the first axle being a trailer axle and being driven by rotation of the wheel, wherein the trailer axle rotationally drives the plurality of CVTs, and the second axle being a generator axle and being driven by the plurality of CVTs, wherein the generator axle rotationally drives the generator.

In addition to one or more of the above disclosed features or as an alternate the transportation unit comprises a plurality of clutches including a first clutch and a second clutch, wherein the first clutch connects the trailer axle to the plurality of CVTs and the second clutch connects the plurality of CVTs to the generator axle.

In addition to one or more of the above disclosed features or as an alternate the transportation unit comprises a plurality of speed sensors including a first speed sensor and a second speed sensor, wherein the first speed sensor is operationally connected to the trailer axle and the second speed sensor is operationally connected to the generator axle, and a controller that is an electric controller that electrically communicates with the plurality of speed sensors and controls the plurality of clutches to switch between the plurality of CVTs.

In addition to one or more of the above disclosed features or as an alternate the plurality of CVTs comprise a plurality of input shafts including a first input shaft and a second input shaft, wherein the plurality of input shafts are operationally connected to the first clutch, the first input shaft drives the first CVT, and the second input shaft drives the second CVT, a plurality of output shafts including a first output shaft and a second output shaft, wherein the plurality of output shafts are operationally connected to the second clutch, the first output shaft is driven by the first CVT and the second output shaft is driven by the second CVT, wherein the plurality of clutches simultaneously switch between the plurality of input shafts and plurality of output shafts to maintain the narrow range of rotational output from the plurality of CVTs to the generator during rotation of the wheel.

In addition to one or more of the above disclosed features or as an alternate the trailer axle, the first clutch, and the plurality of input shafts are disposed on a first axis, the generator axle, the second clutch and the plurality of output shafts are disposed on a second axis, and the first axis and the second axis are offset.

In addition to one or more of the above disclosed features or as an alternate the transportation unit comprises a first set of pulleys that includes a first input pulley on the first input shaft and a first output pulley on the first output shaft, the first set of pulleys being rotationally connected to the first CVT, and a second set of pulleys that includes a second input pulley on the second input shaft and a second output pulley on the second output shaft, the second set of pulleys being rotationally connected to the second CVT, and a loop that rotationally connects the first set of pulleys when the first CVT drives the generator axle and rotationally connects the second set of pulleys when the second CVT drives the generator axle.

In addition to one or more of the above disclosed features or as an alternate the loop is a v chain or v belt.

In addition to one or more of the above disclosed features or as an alternate the plurality of input shafts are concentric with at least a portion of an axial span of the first input shaft being radially outside the second input shaft, and the plurality of output shafts are concentric with at least a portion of an axial span of the first output shaft being radially inside the second output shaft.

In addition to one or more of the above disclosed features or as an alternate wheel rotational input within a first input rotational band engages the first CVT, and wheel rotational input within a second input rotational band engages the second CVT. Rotational output from the plurality of CVTs to the generator is substantially constant for wheel rotational input throughout the first input rotational band and the second input rotational band.

Further disclosed is a method of driving a generator in a transportation unit wherein the transportation unit includes a plurality of roadway wheels including wheel, and a plurality of continuously variable transmissions (CVTs) including a first CVT and a second CVT, the plurality of CVTs receiving rotational input from the wheel, and the method comprises rotationally driving the generator by rotational output from the plurality of CVTs as well as one or more of the above disclosed features.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
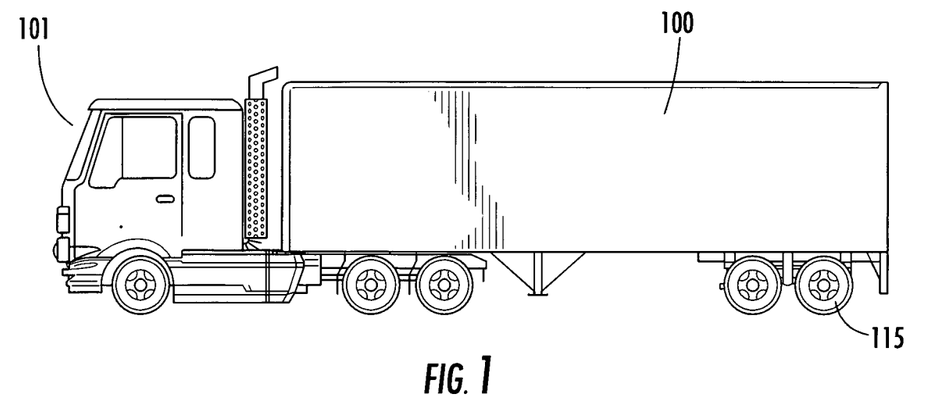
FIG. 1 illustrates a transportation unit according to an embodiment.

Turning to FIG. 1, disclosed is a transportation unit 100. The transportation unit 100 which may be a trailer hauled by a truck 101. The transportation unit 100 may include a plurality of roadway wheels including a wheel 110.

Figure 2:
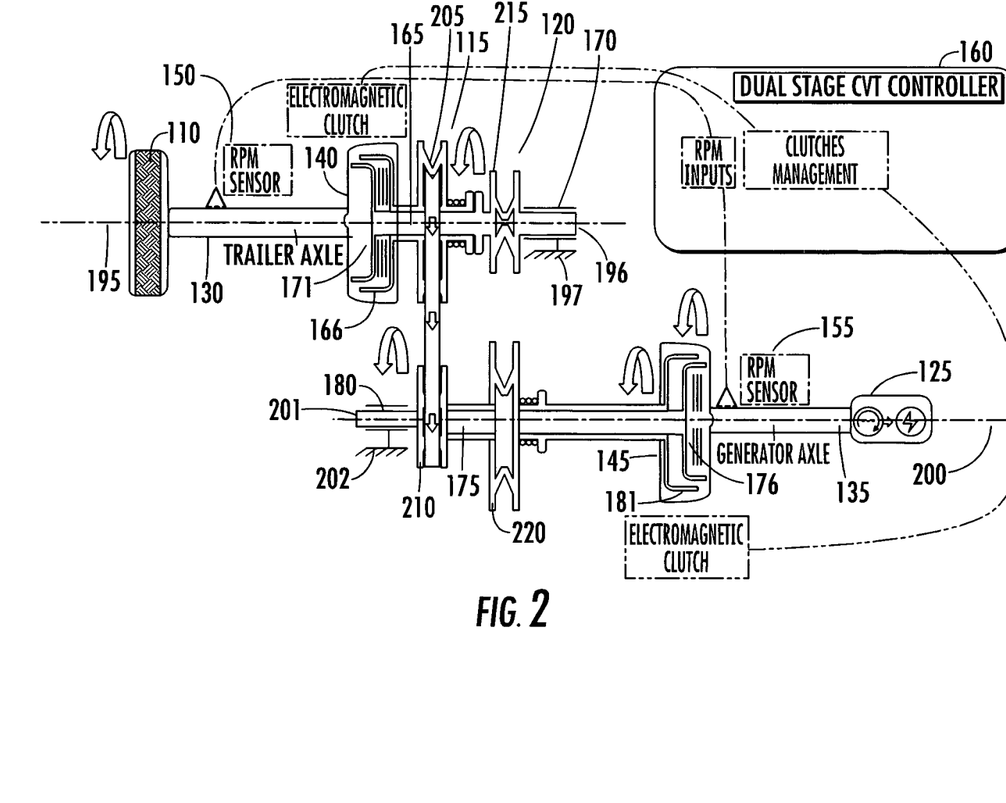
FIG. 2 illustrates a transmission configuration at a relatively low wheel rotational speed according to an embodiment.
Figure 3:
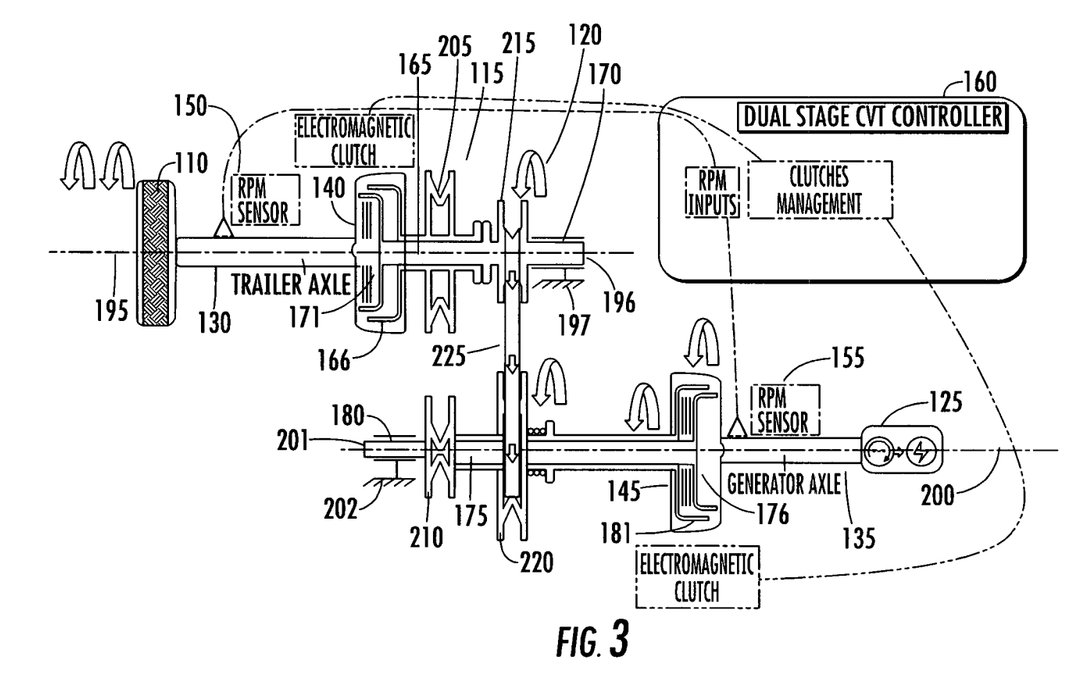
FIG. 3 illustrates a transmission configuration at a relatively high wheel rotational speed according to an embodiment.

Turning to FIGS. 2 and 3, included are a plurality of continuously variable transmissions (CVTs) including a first CVT 115 and a second CVT 120. The plurality of CVTs may receive rotational input from the wheel 110. A generator 125 may be rotationally driven by rotational output from the plurality of CVTs. Each of the plurality of CVTs may be engaged over one of a corresponding plurality of discrete wheel rotational speeds in revolutions per minute (RPM). Accordingly, a wide range of rotational input to the plurality of CVTs may produce a narrow range of rotational output from the plurality of CVTs.

For example, the first CVT 115 may be optimized for wheel rotational input corresponding to a truck driving speed of between almost idle to around sixty kilometers per hour. The second CVT 120 may be optimized for wheel rotational input corresponding to a truck driving speed of around sixty kilometers per hour and above. These speed references are merely for illustration and represent one of many possible configurations. Other speed ratios and/or additional CVTs may be utilized to obtain desired results. When each of the CVTs is used for speeds at which it is optimized, rotational output to the generator 125 may be relatively steady throughout the range of motion for the wheel 110. Accordingly, the generator 125 may be charged throughout an almost full range of truck speeds, rather than being charged for one narrow band of available truck speeds.

With further reference to FIGS. 2 and 3 an included plurality of axles may include a first axle 130 and a second axle 135. The first axle 130 may be a trailer axle driven by rotation of the wheel 135. The trailer axle 130 may rotationally drive the plurality of CVTs. The second axle 135 may be a generator axle and may be driven by the plurality of CVTs. The second axle 135 may rotationally drive the generator 125.

An included plurality of clutches may include a first clutch 140 and a second clutch 145, both of which may be electromagnetic clutches. The first clutch 140 may connect the trailer axle 130 and the plurality of CVTs. The second clutch 145 may connect the plurality of CVTs and the generator axle 135. As illustrated, through the axles, clutches and CVTs, the wheel 110 is rotationally connected to the generator 125.

An included plurality of speed sensors may including a first speed sensor 150 and a second speed sensor 155, both of which being rotational speed sensors. The first speed sensor 150 may be operationally connected to the trailer axle 130 and the second speed sensor 155 may be operationally connected to the generator axle 135. A controller 160, which may be an electronic controller, and more specifically a dual stage CVT controller, may electrically communicate with the plurality of speed sensors and control the plurality of clutches to switch between the plurality of CVTs.

For example, the controller 160 may determine with the sensors that the trailer axle 130 is spinning in a range for which the first CVT 115 is optimized to maintain a target rotational speed for the generator axle 135. If the second CVT 120 is engaged then the controller 160 may engage the clutches to switch from the first second CVT 120 to the first CVT 115. The controller 160 may determine with the sensors that the trailer axle 130 is spinning in a range for which the second CVT 120 is optimized to maintain a target rotational speed for the generator axle 135. If the first CVT 115 is engaged then the controller 160 may engage the clutches to switch from the first CVT 115 to the second CVT 120.

The plurality of CVTs may comprise a plurality of input shafts including a first input shaft 165 and a second input shaft 170. The plurality of input shafts may be operationally connected to the first clutch 140. For example the first input shaft 165 may have a first input end 166 disposed within the first clutch 140 and the second input shaft 170 may have a second input end 171 disposed within the first clutch 140. The first input shaft 165 may drive the first CVT 115, and the second input shaft 170 may drive the second CVT 120.

A corresponding plurality of output shafts may include a first output shaft 175 and a second output shaft 180. The plurality of output shafts may be operationally connected to the second clutch 145. For example the first input shaft 175 may have a first out end 176 disposed within the second clutch 145 and the second output shaft 180 may have a second output end 181 disposed within the second clutch 154. The first output shaft 175 is driven by the first CVT 115 and the second output shaft 180 is driven by the second CVT 120.

The plurality of clutches, based on action of the controller 160, may simultaneously switch between the plurality of input shafts and plurality of output shafts. Such switching, as indicated above, is intended to maintain the narrow range of rotational output from the plurality of CVTs to the generator 125 during rotation of the wheel 110.

As illustrated in FIGS. 2 and 3 the trailer axle 130, the first clutch 140, and the plurality of input shafts may be disposed on a first axis 195. The generator axle 135, the second clutch 145 and the plurality of output shafts may be disposed on a second axis 200. The first axis 195 and the second axis 200 may be offset. In addition, for stability, a first end 196 of the first axis 195 that is distal to the wheel 110 may be supported on a rigid ground 197, which may be a first portion of the trailer frame. Similarly a second end 201 of the second axis 200 that is distal to the generator 125 may be supported on a rigid ground 202, which may be a second portion of the trailer frame.

An included first set of pulleys includes a first input pulley 205 on the first input shaft 165 and a first output pulley 210 on the first output shaft 175. The first set of pulleys may be rotationally connected to the first CVT 115. A second set of pulleys includes a second input pulley 215 on the second input shaft 170 and a second output pulley 220 on the second output shaft 180. The second set of pulleys may be rotationally connected to the second CVT 120. A loop 225 rotationally connects the first set of pulleys when the first CVT 115 drives the generator axle 135 and rotationally connects the second set of pulleys when the second CVT 120 drives the generator axle 135. In one embodiment the loop 225 is a v-chain or v-belt. Tension in the loop 225 drives the output side of the disclosed configuration.

The plurality of input shafts may be concentric with at least a portion of an axial span of the first input shaft 165 being radially outside the second input shaft 170. In addition the plurality of output shafts may be concentric with at least a portion of an axial span of the first output shaft 175 being radially inside the second output shaft 180. This configuration enables the input shafts to rotate about the first axis 195 in the first clutch 140 and enables the out shafts to rotate about the second axis 200 in the second clutch 145.

From the above configuration, for example, wheel rotational input within a first input rotational band engages the first CVT 115, and wheel rotational input within a second input rotational band engages the second CVT 120. Rotational output from the plurality of CVTs to the generator 125 is substantially constant for wheel rotational input throughout the first input rotational band and the second input rotational band.

While the above disclosed embodiment may be applicable to a transportation refrigeration unit, such is not a limiting application.

Accordingly, with the above embodiments mechanical energy from an axle may be driven through a multi (dual) stage mechanical continually variable transmission (CVT), wherein V-belt or V-chain positioning may provide for a speed ratio management. Thus, a fix ratio gear box may be replaced by a CVT. With the CVTs one may be a power drive, one may be driven, and both may be linked by the V-belt or V-metallic chain. In a low speed (from 0 km/h) a gear ratio may be low (for example 1:15 or 1:20). This may allow the generator to run without being restricted to a minimum axle speed. When the vehicle speed increases, the CVTs may proportionally and automatically increase gear ratios. When the vehicle runs at high speeds (example above 60 km/hr), the gear ratio may be increased (for example from 1.20 to 1:10 or 1:8).

Because of a relatively infinite and instantaneous adjustability, the CVTs may increase efficiency of the energy management system (EMS) by maintaining a running operation for the generator at all axle speeds. There is almost no minimum vehicle speed, so the EMS may operate more efficiently, and axle energy may be conserved. Thus the disclosed embodiments may enable the generator to turn at a relatively consistent rotational speed. This may lead to a simplified electrical system, as the generator rpm may be relatively constant. This is because a relatively constant generator axle rotational speed may provide for an easier conversion of alternating current (AC) to directed current (DC) without the use of an inverter.

Thus the disclosed embodiments provide a multi-stage mechanical continuously variable transmission (CVT) for an energy management system (EMS) that may run a generator when trailer speed is low as well as high. By following trailer speeds, the trailer controller may be able to manage a trailer clutch and select an appropriate one of the plurality of CVTs relative to the velocity range. The first CVT of the plurality of CVTs may be utilized for a low speed range (as a non-limiting example, between 0-60 km/h). The second CVT of the plurality of CVTs is utilized for a high speed range (as non-limiting example, 60-120 km/h).

The plurality of CVT may drive the generator with a steady generator rpm during a large and variable range of trailer speeds. The multi-stage CVT may provide for simplified the electric hardware such that onboard inverters and batteries may be downsized or removed, depending on load requirements.

Figure 4:
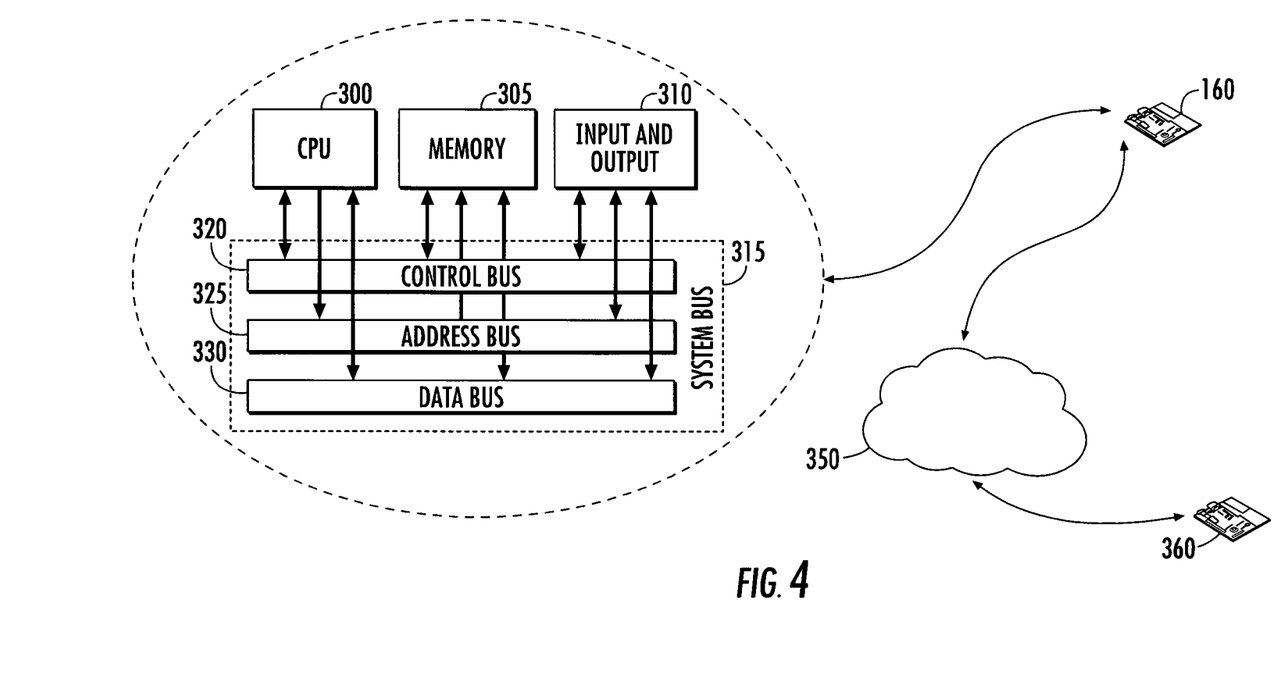
FIG. 4 illustrates technical features associated with one or more of the controllers disclosed herein.

Turning now to FIG. 4, additional features of the controller 160 will be briefly disclosed. The controller 160 may be a computing device that includes processing circuitry that may further include an application specific integrated circuit (ASIC), an electronic circuit with one or more elemental circuit components such as resistors, an electronic processor (shared, dedicated, or group) 300 and memory 305 that executes one or more software algorithms or firmware algorithms and programs, contains relevant data which may be dynamically collected or disposed in one or more look-up tables, a combinational logic circuit that contains one or more operational amplifiers, and/or other suitable interfaces and components that provide the described functionality. For example, the processor 300 processes data stored in the memory 305 and employs the data in various control algorithms, diagnostics and the like.

The controller 160 may further include, in addition to a processor 300 and memory 305, one or more input and/or output (I/O) device interface(s) 310 that are communicatively coupled via an onboard (local) interface to communicate among the plurality of controllers. The onboard interface may include, for example but not limited to, an onboard system bus 315, including a control bus 320 (for inter-device communications), an address bus 325 (for physical addressing) and a data bus 330 (for transferring data). That is, the system bus 315 enables the electronic communications between the processor 300, memory 305 and I/O connections 310. The I/O connections 310 may also include wired connections and/or wireless connections. The onboard interface may have additional elements, which are omitted for simplicity, such as controllers, buffers (caches), drivers, repeaters, and receivers to enable electronic communications.

In operation, the processor 300 onboard the controller 160 may be configured to execute software algorithms stored within the memory 305, to communicate data to and from the memory 305, and to generally control computing operations pursuant to the software algorithms. The algorithms in the memory 305, in whole or in part, may be read by the processor 300, perhaps buffered within the processor 300, and then executed. The processor 300 may include hardware devices for executing the algorithms, particularly algorithms stored in memory 305. The processor 300 may be a custom made or a commercially available processor 300, a central processing units (CPU), an auxiliary processor among several processors associated with computing devices, semiconductor based microprocessors (in the form of microchips or chip sets), or generally any such devices for executing software algorithms.

The memory 305 onboard the controller 160 may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 305 may incorporate electronic, magnetic, optical, and/or other types of storage media. The memory 305 may also have a distributed architecture, where various components are situated remotely from one another, but may be accessed by the processor 300.

The software algorithms in the memory 305 onboard the controller 160 may include one or more separate programs, each of which includes an ordered listing of executable instructions for implementing logical functions. A system component embodied as software algorithms may be construed as a source program, executable program (object code), script, or any other entity comprising a set of instructions to be performed. When constructed as a source program, the software algorithms may be translated via a compiler, assembler, interpreter, or the like, which may or may not be included within the memory.

Some of the input/output (I/O) devices that may be coupled to the controller 160 using the system I/O Interface(s) 310, the wired interfaces and/or the wireless interfaces will now be identified but the illustration of which shall be omitted for brevity. Such I/O devices include, but are not limited to (i) input devices such as a keyboard, mouse, scanner, microphone, camera, proximity device, etc., (ii) output devices such as a printer, display, etc., and (iii) devices that communicate both as inputs and outputs, such as a modulator/demodulator (modem; for accessing another device, system, or network), a radio frequency (RF) or other transceiver, a telephonic interface, a bridge, a router, etc.

Further, using the wireless connection, the controller 160 may communicate over a network 350 to another controller 360 in another electronic device, for example, to report problems with the CVTs. The wireless communication may occur by applying electronic short range communication (SRC) protocols. Such protocols may include local area network (LAN) protocols and/or a private area network (PAN) protocols. LAN protocols include WiFi technology, which is a technology based on the Section 802.11 standards from the Institute of Electrical and Electronics Engineers, or IEEE. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the Institute of Electrical and Electronics Engineers (IEEE). More specifically, Zigbee represents a suite of high-level communication protocols used to create personal area networks with small, low-power digital radios for low-power low-bandwidth needs, and is best suited for small scale projects using wireless connections. Such wireless connection 330 may include Radio-frequency identification (RFID) technology, which is another SRC technology used for communicating with an integrated chip (IC) on an RFID smartcard.

One should note that the above disclosed architecture, functionality, and/or hardware operations of the controller 160 may be implemented using software algorithms. In the software algorithms, such functionality may be represented as a module, segment, or portion of code, which comprises one or more executable instructions for implementing the specified logical function(s). It should also be noted that such modules may not necessarily be executed in any particular order and/or executed at all.

One should also note that any of the functionality of the controller 160 described herein can be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device.

Further, the computer readable medium in the controller 160 may include various forms of computer readable memory 305. For example the computer readable memory 305 may be integral to an apparatus or device, which may include one or more semiconductors, and in which the communication and/or storage technology may be one or more of electronic, magnetic, optical, electromagnetic or infrared. More specific examples (a non-exhaustive list) of a computer-readable medium the illustration of which being omitted for brevity include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

In addition, the above distributed system of controllers is not intended to be limiting. In one embodiment, each of the controllers on the same side of the network may be the same device such that no network there between is required. In one embodiment a single on-site controller is provided instead of the distributed system of controllers. In one embodiment the controllers on the same side of the network are controlled by servers located over the World Wide Web, using a cloud computing configuration. In one embodiment, the distributed controller network is hard-wired for all telecommunication services so that no wireless network is necessary. In one embodiment redundant wireless and wired networks are utilized which automatically switch between such services to minimize network congestion.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transportation unit, comprising:
   a plurality of roadway wheels,
   a plurality of continuously variable transmissions (CVTs) including a first CVT and a second CVT, the plurality of CVTs receiving rotational input from a wheel of the plurality of roadway wheels, and a generator that is rotationally driven by rotational output from the plurality of CVTs, and wherein each of the plurality of CVTs is engaged over one of a corresponding plurality of discrete wheel rotational speeds.

2. The transportation unit of claim 1, comprising:

a plurality of axles including a first axle and a second axle, the first axle being a trailer axle and being driven by rotation of the wheel, wherein the trailer axle rotationally drives the plurality of CVTs, and the second axle being a generator axle and being driven by the plurality of CVTs, wherein the generator axle rotationally drives the generator.

3. The transportation unit of claim 2, comprising a plurality of clutches including a first clutch and a second clutch, wherein the first clutch connects the trailer axle to the plurality of CVTs and the second clutch connects the plurality of CVTs to the generator axle.

4. The transportation unit of claim 3, comprising:

a plurality of speed sensors including a first speed sensor and a second speed sensor, wherein the first speed sensor is operationally connected to the trailer axle and the second speed sensor is operationally connected to the generator axle, and a controller that is an electric controller that electrically communicates with the plurality of speed sensors and controls the plurality of clutches to switch between the plurality of CVTs.

5. The transportation unit of claim 3, wherein the plurality of CVTs comprise:

a plurality of input shafts including a first input shaft and a second input shaft, wherein the plurality of input shafts are operationally connected to the first clutch, the first input shaft drives the first CVT, and the second input shaft drives the second CVT, a plurality of output shafts including a first output shaft and a second output shaft, wherein the plurality of output shafts are operationally connected to the second clutch, the first output shaft is driven by the first CVT and the second output shaft is driven by the second CVT, wherein the plurality of clutches simultaneously switch between the plurality of input shafts and plurality of output shafts to maintain a range of rotational output from the plurality of CVTs to the generator during rotation of the wheel.

6. The transportation unit of claim 5, wherein the trailer axle, the first clutch, and the plurality of input shafts are disposed on a first axis, the generator axle, the second clutch and the plurality of output shafts are disposed on a second axis, and the first axis and the second axis are offset.

7. The transportation unit of claim 5, comprising:

a first set of pulleys that includes a first input pulley on the first input shaft and a first output pulley on the first output shaft, the first set of pulleys being rotationally connected to the first CVT, and a second set of pulleys that includes a second input pulley on the second input shaft and a second output pulley on the second output shaft, the second set of pulleys being rotationally connected to the second CVT, and a loop that rotationally connects the first set of pulleys when the first CVT drives the generator axle and rotationally connects the second set of pulleys when the second CVT drives the generator axle.

8. The transportation unit of claim 7, wherein the loop is a v chain or v belt.

9. The transportation unit of claim 5, wherein:

the plurality of input shafts are concentric with at least a portion of an axial span of the first input shaft being radially outside the second input shaft, and the plurality of output shafts are concentric with at least a portion of an axial span of the first output shaft being radially inside the second output shaft.

10. The transportation unit of claim 1, wherein:

wheel rotational input within a first input rotational speed range engages the first CVT, and wheel rotational input within a second input rotational speed range engages the second CVT, and wherein rotational output from the plurality of CVTs to the generator is substantially constant for wheel rotational input throughout the first input rotational speed range and the second input rotational speed range.

11. A method of driving a generator in a transportation unit, wherein the transportation unit includes a plurality of roadway wheels, and a plurality of continuously variable transmissions (CVTs) including a first CVT and a second CVT, the plurality of CVTs receiving rotational input from a wheel of the plurality of roadway wheels, and the method comprises:

rotational driving the generator by rotational output from the plurality of CVTs, wherein each of the plurality of CVTs is engaged over one of a corresponding plurality of discrete wheel rotational speeds.

12. The method of claim 11, wherein the transportation unit comprises:

a plurality of axles including a first axle and a second axle, the first axle being a trailer axle and being driven by rotation of the wheel, wherein the trailer axle rotationally drives the plurality of CVTs, and the second axle being a generator axle and being driven by the plurality of CVTs, wherein the generator axle rotationally drives the generator.

13. The method of claim 12, wherein the transportation unit comprises:

a plurality of clutches including a first clutch and a second clutch, wherein the first clutch connects the trailer axle to the plurality of CVTs and the second clutch connects the plurality of CVTs to the generator axle.

14. The method of claim 13, wherein the transportation unit comprises:

a plurality of speed sensors including a first speed sensor and a second speed sensor, wherein the first speed sensor is operationally connected to the trailer axle and the second speed sensor is operationally connected to the generator axle, and a controller that is an electric controller that electrically communicates with the plurality of speed sensors and controls the plurality of clutches to switch between the plurality of CVTs.

15. The method of claim 13, wherein the plurality of CVTs comprise:

a plurality of input shafts including a first input shaft and a second input shaft, wherein the plurality of input shafts are operationally connected to the first clutch, the first input shaft drives the first CVT, and the second input shaft drives the second CVT, a plurality of output shafts including a first output shaft and a second output shaft, wherein the plurality of output shafts are operationally connected to the second clutch, the first output shaft is driven by the first CVT and the second output shaft is driven by the second CVT, wherein the plurality of clutches simultaneously switch between the plurality of input shafts and plurality of output shafts to maintain a range of rotational output from the plurality of CVTs to the generator during rotation of the wheel.

16. The method of claim 15, wherein the transportation unit comprises:

the trailer axle, the first clutch, and the plurality of input shafts are disposed on a first axis, the generator axle, the second clutch and the plurality of output shafts are disposed on a second axis, and the first axis and the second axis are offset.

17. The method of claim 15, wherein the transportation unit comprises:

a first set of pulleys that includes a first input pulley on the first input shaft and a first output pulley on the first output shaft, the first set of pulleys being rotationally connected to the first CVT, and a second set of pulleys that includes a second input pulley on the second input shaft and a second output pulley on the second output shaft, the second set of pulleys being rotationally connected to the second CVT, and a loop that rotationally connects the first set of pulleys when the first CVT drives the generator axle and rotationally connects the second set of pulleys when the second CVT drives the generator axle.

18. The method of claim 17, wherein the loop is a v chain or v belt.

19. The method of claim 15, wherein the transportation unit comprises:

the plurality of input shafts are concentric with at least a portion of an axial span of the first input shaft being radially outside the second input shaft, and the plurality of output shafts are concentric with at least a portion of an axial span of the first output shaft being radially inside the second output shaft.

20. The method of claim 11, wherein:

wheel rotational input within a first input rotational speed range engages the first CVT, and wheel rotational input within a second input rotational speed range engages the second CVT, and wherein rotational output from the plurality of CVTs to the generator is substantially constant for wheel rotational input throughout the first input rotational speed range and the second input rotational speed range.

* * * * *